(12) United States Patent
Liu et al.

(10) Patent No.: US 9,237,418 B2
(45) Date of Patent: Jan. 12, 2016

(54) POSITIONING DATABASE MANAGEMENT APPLIED TO SERVER-BASED POSITIONING SYSTEM

(71) Applicant: Marvell World Trade Ltd., St. Michael (BB)

(72) Inventors: BoChih Liu, Shanghai (CN); Zhike Jia, Fremont, CA (US); Yuan Ren, Shanghai (CN); Jing Yu, Shanghai (CN); Jian Chen, Shanghai (CN)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

(21) Appl. No.: 14/326,766

(22) Filed: Jul. 9, 2014

(65) Prior Publication Data
US 2015/0031389 A1   Jan. 29, 2015

Related U.S. Application Data

(60) Provisional application No. 61/858,870, filed on Jul. 26, 2013, provisional application No. 61/892,649, filed on Oct. 18, 2013.

(51) Int. Cl.
*H04W 24/00* (2009.01)
*H04W 4/02* (2009.01)

(52) U.S. Cl.
CPC ..................................... *H04W 4/02* (2013.01)

(58) Field of Classification Search
None
See application file for complete search history.

(56) References Cited

U.S. PATENT DOCUMENTS

| 7,359,718 | B2 * | 4/2008 | Tao | G01S 5/0252 |
| | | | | 455/414.1 |
| 2004/0203885 | A1 * | 10/2004 | Quaid | 455/456.1 |
| 2011/0317579 | A1 * | 12/2011 | Jones | G01S 5/02 |
| | | | | 370/252 |
| 2012/0149415 | A1 * | 6/2012 | Valaee | H04W 64/00 |
| | | | | 455/507 |
| 2014/0011518 | A1 * | 1/2014 | Valaee | H04W 64/00 |
| | | | | 455/456.1 |
| 2014/0194145 | A1 * | 7/2014 | Do | G01S 5/0252 |
| | | | | 455/456.3 |
| 2014/0221013 | A1 * | 8/2014 | Vaccari | H04W 4/028 |
| | | | | 455/456.3 |

* cited by examiner

*Primary Examiner* — German J Viana Di Prisco

(57) ABSTRACT

Systems and methods are provided for positioning determination for mobile devices. A system includes: a database configured to store positioning data associated with one or more base stations in a network, and a data management component configured to compare the parameters with one or more parameter thresholds, and update the positioning data based at least in part on the comparison of the parameters and the parameter thresholds. The updated positioning data is used for positioning determination of a mobile device.

18 Claims, 5 Drawing Sheets

POSITIONING DATABASE MANAGEMENT APPLIED TO SERVER-BASED POSITIONING SYSTEM

CROSS-REFERENCE TO RELATED APPLICATIONS

This disclosure claims priority to and benefit from U.S. Provisional Patent Application No. 61/858,870, filed on Jul. 26, 2013 and U.S. Provisional Patent Application No. 61/892,649, filed on Oct. 18, 2013, the entirety of which are incorporated herein by reference.

FIELD

The technology described in this patent document relates generally to database management, and in particular, to positioning database management applied to a server-based positioning system.

BACKGROUND

A modern wireless device can incorporate functions of a satellite positioning system receiver, a cellular transceiver, or a wireless transceiver. When a wireless device functions as a cellular transceiver and/or a wireless transceiver, the device can communicate wirelessly with a wireless communication network by employing radio frequency (RF) field propagation. The radio frequency, a frequency within the electromagnetic spectrum associated with radio wave propagation, is supplied to an antenna that creates an electromagnetic field that propagates through space. A component of a wireless communication network can be a wireless station, for example, a cellular base station of a cellular network, or an access point of a wireless local area network (LAN) or a wireless personal area network (PAN). The wireless station can allow a wireless device to communicate with a wired network through an access gateway. Oftentimes, the wireless station broadcasts a beacon signal that provides key information for wireless connections with wireless devices.

SUMMARY

In accordance with the teachings described herein, systems and methods are provided for positioning determination for mobile devices. A system includes: a database configured to store positioning data associated with one or more base stations in a network, and a data management component configured to compare the parameters with one or more parameter thresholds, and update the positioning data based at least in part on the comparison of the parameters and the parameter thresholds. The updated positioning data is used for positioning determination of a mobile device.

In accordance with the teachings described herein, a system for positioning database management includes: a database and an apparatus. The database is configured to store positioning data, the positioning data associating position information of a location with an identifier of a wireless station for providing wireless connection at the location and a signal characteristic received at the location. The apparatus is configured to: determine whether an update condition for triggering an update for a group of the positioning data associated with a wireless station is satisfied; apply, when the update condition is satisfied, one or more cluster calculations to select one or more clusters that contain junk data to be removed from the group of the positioning data; and store the updated positioning data. The group of the updated positioning data is used for a server-based positioning system to perform a position determination of a wireless device.

In accordance with the teachings described herein, a method is provided for positioning database management. It is determined whether an update condition for triggering an update for the group of the positioning data associated with a wireless station is satisfied. The positioning data associates position information of a location with an identifier of a wireless station for providing wireless connection at the location and a signal characteristic received at the location. When the update condition is satisfied, one or more cluster calculations are applied to select one or more clusters that contain junk data to be removed from the group of the positioning data. The updated positioning data is stored. The group of the updated positioning data is used for determining a position of a wireless device.

In accordance with the teachings described herein, a system is provided for determining a position information of a wireless device. The system includes: one or more processors configured to: receive a position request from a wireless device that receives an identifier and a specific characteristic of a wireless signal from a specific wireless station, identify the specific wireless station using the identifier to retrieve a group of positioning data from a database, select a subset in the group of positioning data using the specific characteristic, and determine position information of the wireless device using the selected subset of positioning data.

DETAILED DESCRIPTION

A database based positioning can be used to determine a position of a wireless device through evaluation of the RF measurements. These measurements are compared to the entries of the positioning database. The corresponding calculations find the best matching database entry and thus lead to a position estimate. This method does not rely on line of sight conditions but benefits from the more distinct radio patterns of multipath environments. Only network inherent parameters are utilized so that no hardware modifications are required and legacy devices can be employed. Although database based positioning can provide high degree of accuracy and is utilized for network-based positioning system, the positioning performance is dependent on the accuracy of positioning data.

Figure 1:
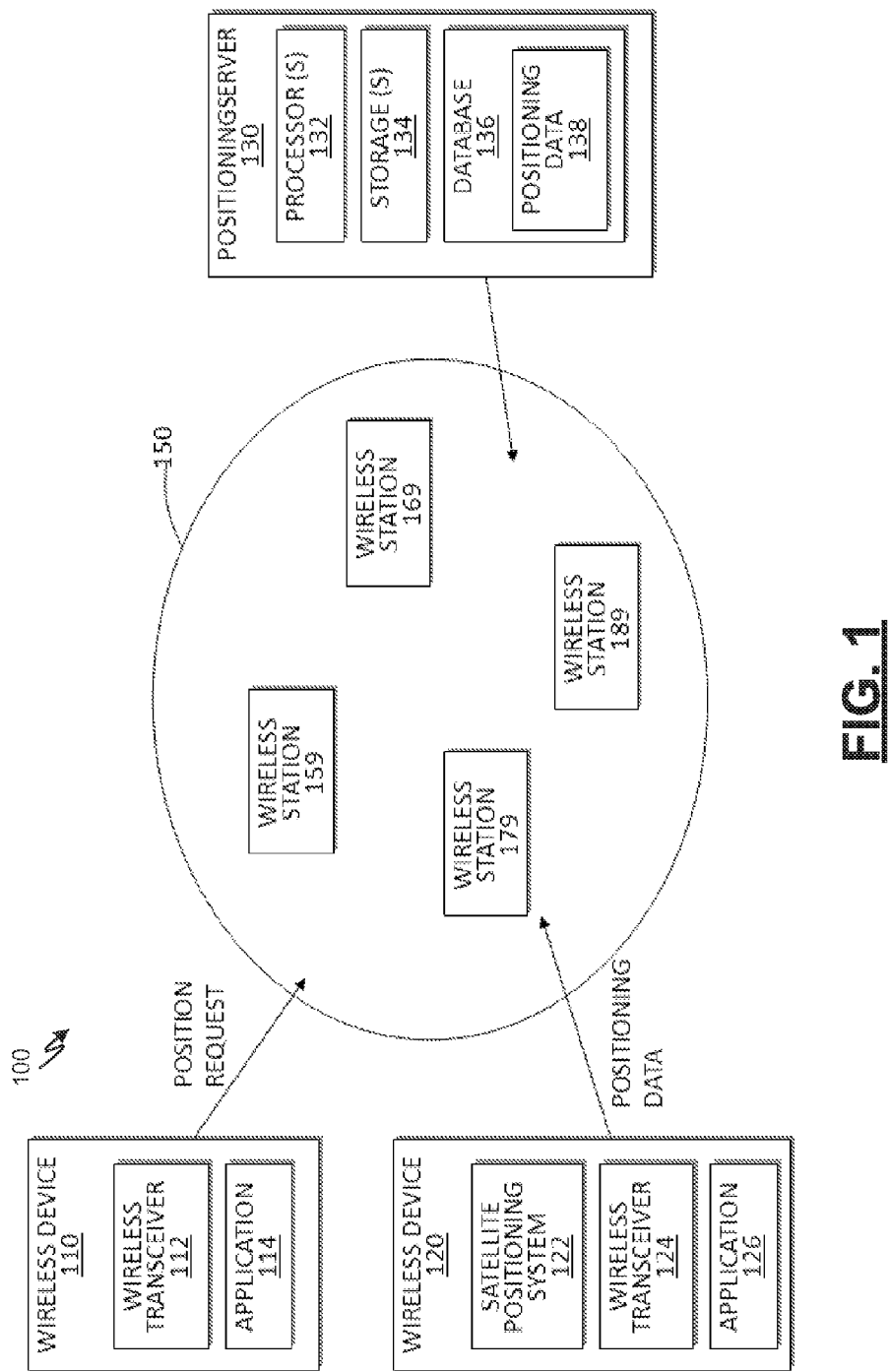
FIG. 1 depicts an example diagram showing a positioning system according to an embodiment of the disclosure.

FIG. 1 depicts an example diagram showing a positioning system 100 according to an embodiment of the disclosure. As shown in FIG. 1, the system 100 includes a plurality of elements, each of which acts to provide specific functionality. These elements include software which is stored in a storage and then executed on one or more processors to provide the functionality, hardware which is adapted to provide the element's functionality, or a combination of software and hardware which work together to provide the element's functionality.

The system 100 includes a plurality of wireless devices, such as wireless devices 110 and 120, a positioning server 130, and a network 150. The network 150 includes a plurality of wireless stations, such as wireless stations 159, 169, 179, and 189, configured to communicate with the wireless devices through radio frequency signals. As shown in FIG. 1, the network 150 may include a single network or a plurality of networks of the same or different types. The positioning server 130 includes a database 136 to store previously obtained positioning data 138. Each positioning data associates position information of a location with fingerprints of wireless communication at the location. In an example, the fingerprints of wireless communication include an identifier of a wireless station that covers wireless communication at the location and a characteristic of a wireless signal received at the location. The positioning data in the database is managed into groups associated with wireless stations.

As shown in FIG. 1, the wireless stations can be cellular base stations in a cellular network. Each wireless station is configured according to various cellular technologies, such as Global System for Mobile Communications/General Packet Radio Service (GSM/GPRS), Wideband Code Division Multiple Access (WCDMA), Code Division Multiple Access 2000 (CDMA2000), and Long Term Evolution (LTE) and the like to use radio frequency signals to communicate with the wireless devices. The cellular base station of a cellular network can broadcast a beacon signal providing an identifier (e.g., cell global identifier) for a plurality of wireless devices to connect to it when the wireless devices are within a communication range of the cellular base station. In turn, a plurality of cellular base stations may be available to a wireless device. As shown in FIG. 1, the wireless device 120 can be connected to cellular base station 179 via a wireless transceiver 124, and cellular base station 179 can be a serving base station for the wireless device 120. The serving base station 179 can provide the wireless device 120 with telephony services and/or can relay the transmission, by providing communication access to a wide area network (WAN), such as the Internet, by use of a gateway, to the positioning server 130. While the wireless device 120 is wireless-connected to the serving base station 179, the wireless device 120 may receive beacon signals from neighboring base stations 159, 169, and 189.

As shown in FIG. 1, the wireless stations can be access points in a wireless local area network (LAN) or a wireless personal area network (PAN). Each wireless station is configured according to various communication protocols, such as an Institute of Electrical and Electronics Engineers (IEEE) 802.11 based protocol (e.g., WiFi™ network) or an IEEE 802.15 based protocol (e.g., Bluetooth™ network), to use radio frequency signals to communicate with the wireless devices. The access point can broadcast a beacon signal providing an identifier (e.g., medium access control (MAC) address) for a plurality of wireless devices to connect to it when wireless devices are within a communication range of the access point. In turn, a plurality of access points can be available to a wireless device for connection. Those identifiers need not be associated with access points to which wireless device is connected or can connect. All identifiers of the access points retrieved by wireless device can be used in the position estimate. As shown in FIG. 1, wireless device 120 is located within a communication range of assess point 179 in addition to access points 159, 169, and 189. Wireless device 120 can identify access points 159, 169, 179, and 189 under the wireless communication protocol used in a WiFi™ network. Access points 159, 169, 179, and 189 can be identified by MAC addresses of the access points. Access point 179 can relay the transmission, by providing communication access to a WAN, such as the Internet, to the positioning server 120.

As shown in FIG. 1, the wireless stations include a first plurality of cellular base stations in a cellular network, and a second plurality of access points in a wireless LAN. As shown in FIG. 1, the wireless device 120 can be wireless-connected to cellular base station 179, and the cellular base station 179 can be the serving base station for the wireless device 120. The serving base station 179 can provide the wireless device 120 with telephony services and/or network (e.g., Internet) access. While the wireless device 120 is connected to serving base station 179, wireless device may receive beacon signals from access points 159, 169, and 189.

The wireless devices can be any type of mobile devices, such as laptop computer, tablet computer, smart phone, wearable electronic device, and the like that are configured to communicate with the wireless stations using radio frequency signals. A wireless device can include hardware including, but not limited to, a processor and memory for executing and storing instructions, software including one or more applications and an operating system. The wireless device may have multiple processors and multiple shared or separate memory components. In an example, a wireless device is portable by a person. In another example, a wireless device is installable on a vehicle. The wireless devices are installed with an application for positioning. In an example, a wireless device 120 with the application installed provides positioning data to the positioning server 130. In another example, a wireless device 110 with the application requests positioning service from the positioning server 130.

The positioning server 130 includes a plurality of components for database management and position determination. As shown in FIG. 1, the positioning server 130 includes a processor 132, a storage 134, and a database 136. In an example, the positioning server 130 can include more than one processors and storages. In an example, the positioning server 130 is implemented using a distributed system that includes multiple processors, and/or multiple storages coupled together by a network. The database 136 stores positioning data 138. The positioning data can associate locations with wireless fingerprints, such as identifiers of the wireless stations and wireless signal characteristics. In addition, the storage 134 stores various software instructions, such as a server application for database management and position determination. In an example, the processor 132 executes the server application to provide database management and positioning service.

As shown in FIG. 1, the wireless device 120 includes a plurality of components, such as an antenna (not shown), a receiving circuit (not shown), a transmitting circuit (not shown), a processor (not shown), and the like, to enable wireless communication with the wireless stations. In addition, the wireless device 120 is installed with a satellite positioning system 122, such as a global positioning system (GPS), a wireless transceiver 124, and an application 126. In an example, the satellite positioning system 122 includes a receiver (not shown) to receive signals from four or more satellites. The signals include transmission timing information and satellite location information. Based on the received signals, the satellite positioning system 122 calculates distances to the satellites. Then, the distances to the satellites and the satellite location information are used to determine the position of the wireless device 120. Position information of the location relates generally to geographic coordinates that include a latitude coordinate, a longitude coordinate, and an altitude coordinate of wireless device 120. In an example, position information of the location is represented as a pair of a latitude coordinate and a longitude coordinate.

The application 126 enables the wireless device 120 to communicate with the positioning server 130 via the wireless transceiver 124. In an embodiment, a user of the wireless device 120 turns on the satellite positioning system 122 to allow the wireless device 120 to provide direction information on a trip. When the satellite positioning system 122 is turned on, the application 126 requests a permission by the user, for example via a user interface, to provide positioning data to the positioning server 130. When the user permits the request via the user interface, the application 126 provides information to form positioning data in the positioning server 130. In an example, at a location, the application 126 obtains position information (e.g., latitude and longitude) from the satellite positioning system 122. Further, the application 126 through the wireless transceiver 124 obtains fingerprints of wireless communication at the location, such as identifiers of wireless stations that are in wireless communication with the wireless device 120 and characteristics of wireless signals at the location. In an example, the application 126 through the wireless transceiver 124 obtains a received signal strength indicator (RSSI) as characteristic of a wireless signal received at the location. Further, the application 126 prepares a message to the positioning server 130 according to a network communication protocol (e.g., software for implementing communication protocol, such as the Transmission Control Protocol/Internet Protocol (TCP/IP), Hypertext Transfer Protocol (HTTP), etc.). The message carries information to form a positioning data, such as the position information, an identifier of a wireless station and a characteristic of a wireless signal received at the location from the wireless station. Then, the wireless device 120 sends a wireless signal corresponding to the message to the wireless station and the wireless station forwards the message to the positioning server 130 via the network 150. When the user with the wireless device 120 moves on the trip, at different locations, the wireless device 120 have different wireless fingerprints, such as in communication with different wireless stations, having different values of RSSI, and the like. The wireless device 120 can provide position information associated with wireless fingerprints at the different locations on the trip to the positioning server 130. In an example, when the positioning server 130 receives a message carrying information to form a positioning data, the positioning server 130 retrieves from the message the position information and the associated wireless fingerprints, such as an identifier of a wireless station and a value of RSSI, and forms a positioning data that can associate position information with wireless fingerprints. Further, the positioning server 130 stores the formed positioning data in the database 136.

According to an aspect of the disclosure, various wireless devices are similarly configured as the wireless device 120 to send messages carrying information to form positioning data from different locations. The positioning server 130 receives the messages, form positioning data and stores the positioning data in the database 136. In an example, the positioning data are stored in a positioning database.

Further, the positioning server 130 manages the positioning database. Based on the positioning database, the positioning server 130 provides positioning service to another wireless device, such as the wireless device 110. As shown in FIG. 1, the wireless device 110 includes a plurality of components, such as an antenna (not shown), a receiving circuit (not shown), a transmitting circuit (not shown), a processor (not shown), and the like, to enable wireless communication with the wireless stations. In addition, the wireless device 110 is installed with an application 114 for positioning. In an example, the wireless device 110 does not have a satellite positioning system 122, but has a need of knowing its position.

In an example, at a position when a user of the wireless device 110 wants to know the position, the user instructs the application 114 via a user interface. Then, the application 114 causes the wireless device 110 to send a message according to a network communication protocol to the positioning server 130. The message carries a position request. The wireless device 110 through the wireless transceiver 112 can provide wireless fingerprints, such as an identifier of a wireless station in communication with the wireless device 110, a value of RSSI for a wireless signal received at the location, and the like, to the positioning server 130 in the same message or in a different message. In an embodiment, when the positioning server 130 receives the position request from the wireless device 110, the positioning server 130 identifies the wireless station that is in communication with the wireless device 110. The positioning server 130 retrieves a group of positioning data associated with the wireless station. Further, a group of positioning data associated with a wireless station is clustered into subsets. In an embodiment, the positioning server 130 is configured to determine boundary values for signal characteristics, such as RSSI values and the like, to cluster the positioning data of the group. Further, the positioning server 130 selects a subset in the group of the positioning data for the wireless station that has similar signal characteristic (e.g., RSSI value in a same range) as the wireless device 110 at its location. Then, the positioning server 130 determines a position of the wireless device 110 based on the selected subset in the group of positioning data. In an example, the position information is represented as a pair of a latitude coordinate and a longitude coordinate. The positioning server 130 calculates an average, or a weighted average of locations as a position result from the subset in the group of positioning data. In the example, the positioning server 130 sends a response message carrying the position result to the wireless device 110 according to a network communication protocol.

In an embodiment of the disclosure, the positioning data 138 can be stored in a database 136 of any suitable format. In an example, the positioning data 138 are stored in a format to facilitate extracting a group of position data associated with a wireless station and to facilitate extracting a subset of position data from the group that has a specific signal characteristic. In an example, each group of positioning data associated with a wireless station is clustered into subsets according to clustering boundaries stored in a wireless station information table.

Further, according to an aspect of the disclosure, the positioning server 130 is configured to manage positioning database in order to provide more accurate position determination service. In an embodiment, the positioning server 130 is configured to dynamically manage the positioning database for the new positioning data. In an example, when one or more new positioning data is received, the positioning server 130 determines whether the positioning database needs to be updated. For example, the positioning server 130 determines one or more location-based parameters of the wireless stations according to the positioning data received from the wireless devices. Then, the positioning server 130 compares the location-based parameter to parameter thresholds, and determines whether to update the positioning database based on the comparison. Further, in an example, to update the positioning database, the positioning server 130 selects one or more outliers according to the cluster calculations. Outliers can be clusters that may contain junk data to be removed. Further details of positioning data management processes will be described below with reference to FIGS. 3-5.

Figure 2:
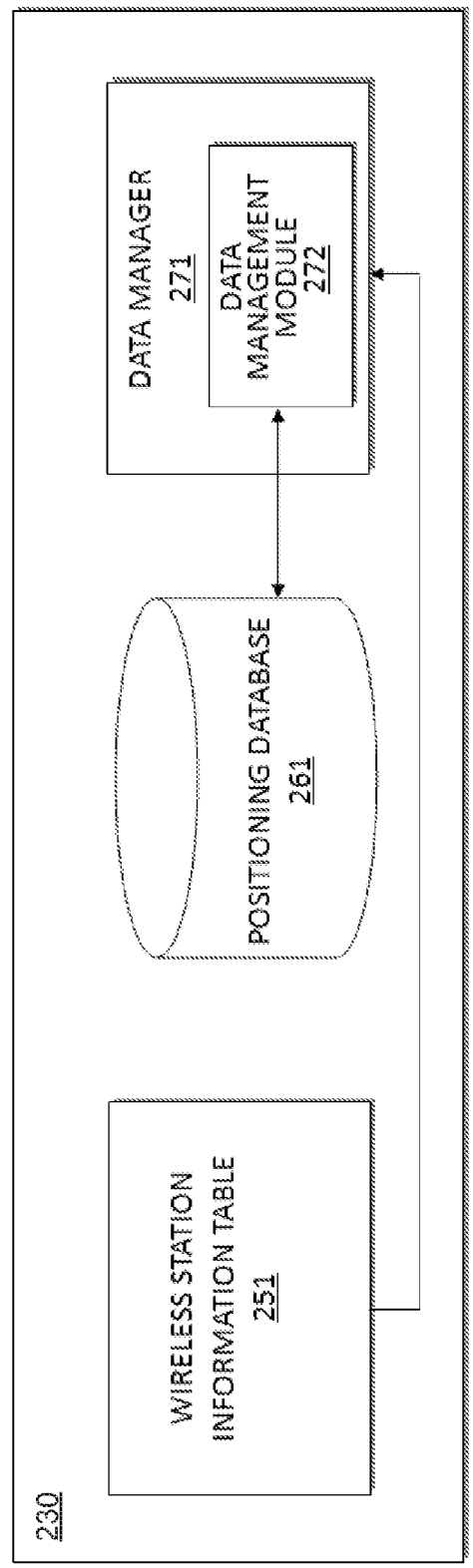
FIG. 2 depicts an example diagram showing a server according to an embodiment of the disclosure.

FIG. 2 depicts an example diagram showing a server according to an embodiment of the disclosure. As shown in FIG. 2, the positioning server 230 includes a plurality of elements, each of which acts to provide specific functionality. These elements include software which is stored in a memory and then executed on a processor to provide the functionality, hardware which is adapted to provide the element's functionality, or a combination of software and hardware which work together to provide the element's functionality.

The positioning server 230 is configured to dynamically perform the cluster calculations to manage positioning database. The positioning server 230 includes a wireless station information table 251, a positioning database 261, and a data manager 271. These elements are coupled together as shown in FIG. 2. The positioning server 230 can include other suitable components (not shown), such as a data retriever, a data processor, a location estimator, a cluster allocator and the like.

In the wireless station information table 251, each entry corresponds to clustering information for a group of positioning data associated with a wireless station (e.g., a cellular base station or an access point). The group of positioning data for a wireless station can be clustered into a plurality of subsets according to clustering boundaries stored in the wireless station information table 251. In an example, the wireless station information table 251 includes a first wireless station information table that is for a cellular network. Further, the wireless station information table 251 includes a second wireless station information table that is for a wireless LAN.

In an example, the positioning server 230 includes a first wireless station information table for a cellular network. The first wireless station information table includes a plurality of fields, such as 23 fields and the like, to store clustering information. Each entry in the first wireless station information table corresponds to clustering information for a group of positioning data associated with a cellular base station in the cellular network. In an example, the group of positioning data is clustered into three subsets according to RSSI values. The 23 fields are (1) an identification of the cellular technology type (Id), (2) mobile country code (MCC), (3) mobile network code (MNC), (4) local area code (LAC), (5) cell identifier (Ci), (6) latitude of the cellular base station (Lat), (7) longitude of the cellular base station (Lon), (8) uncertainty errors for the group of positioning data (Uncert Error), (9) the total number of data in the group of positioning data (Data Num), (10) uncertainty errors for the first subset of positioning data (Uncert1), (11) the number of data in the first subset of positioning data (Data Num1), (12) uncertainty errors for the second subset of positioning data (Uncert2), (13) the number of data in the second subset of positioning data (Data Num2) (14) uncertainty errors for the third subset of positioning data (Uncert3), (15) the number of data in the third subset of positioning data (Data Num3), (16) coverage range (Cover Range), (17) RSSI threshold (RSSI Thrshld), (18) a first RSSI boundary value (RSS1), (19) a second RSSI boundary value (RSS2), (20) a third RSSI boundary value (RSS3), (21) a fourth RSSI boundary value (RSS4), (22) the most recent inquiry time (Inquiry Time) and (23) the most recent update time (Update Time). For example, from the positioning database, a group of positioning data associated with a wireless station identified by the fields (2)-(5) is extracted.

In another example, the positioning server 230 includes a second wireless station information table for a wireless LAN. The second wireless station information table includes a plurality of fields, such as 18 fields and the like, for each entry to store clustering information. Each entry in the second wireless station information table corresponds to clustering information for a group of positioning data associated with an access point in the wireless LAN. In an example, the group of positioning data is clustered into two subsets according to RSSI values. The 18 fields are (1) an identification of wireless LAN type (Id), (2) mobile country code (MCC), (3) media access control address (MAC), (4) latitude of the access point (Lat), (5) longitude of the access point (Lon), (6) uncertainty errors for the group of positioning data (Uncert Error), (7) the total number of data in the group of positioning data (Data Num), (8) uncertainty errors for the first subset of positioning data (Uncert1), (9) the number of data in the first subset of positioning data (Data Num1), (10) uncertainty errors for the second subset of positioning data (Uncert2), (11) the number of data in the second subset of positioning data (Data Num2), (12) coverage range (Cover Range), (13) RSSI threshold (RSSI Thrshld), (14) a first RSSI boundary value (RSS1), (15) a second RSSI boundary value (RSS2), (16) a third RSSI boundary value (RSS3), (17) the most recent inquiry time (Inquiry Time) and (18) the most recent update time (Update Time). For example, from the positioning database, a group of positioning data associated with an access point identified by the fields (2)-(3) is extracted.

The positioning database 261 stores previously obtained positioning data. In an example, each positioning data stores position information (e.g., latitude and longitude) for a location in association with wireless fingerprints (e.g., an identifier of a wireless station, and a RSSI value received from the wireless station) at the location. In an example, the positioning database 261 is organized under a hierarchical folder structure, and the folders are mapped to directories in a file system. The positioning database 261 is updated frequently, such as in real-time, or at a particular time, or during a particular time period, or daily. The population distribution of the positioning data may vary.

The data manager 271 includes a data management module 272 that is configured to dynamically manage the positioning data in positioning database. In an embodiment, the data management module 272 is configured to compare the location-based parameter (e.g., the coverage range in the field (16) of the entry in the first wireless station information table) with parameter threshold (e.g., a coverage threshold). When the location-based parameter exceeds the parameter threshold, it indicates that the group of positioning data associated with a wireless station may contain junk data. The data management module 272 is configured to extract from the positioning database 261 the group of positioning data associated with a wireless station. Further, the data management module 272 is configured to implement one or more cluster calculations to intelligently remove the junk data from the positioning data of the group. In an embodiment, the cluster calculation uses cluster centers to model the group of the positioning data via iterative refinement approach and selects one or more clusters that may contain the junk data to be removed. Further, the data management module 272 is configured to update the group of positioning data associated with a wireless station.

During operation, in an example, when wireless devices, such as the wireless device 160 As shown in FIG. 1, send messages carrying information to form positioning data from different locations, the positioning server 230 receives the messages, forms positioning data and stores the positioning data in the positioning database 261. In an example, the positioning server 230 includes a data retriever (not shown). The data receiver is configured to receive messages carrying information, and to sort the information according to the wireless station information table 251. For example, the data receiver detects a wireless station, and selects an entry in a wireless station information table 251 that identifies the wireless station (e.g., the MCC, the MNC, the LAC, and the Ci in the field (2) to (5) of the selected entry in the first wireless station information table match the identifiers of the wireless station). Then, from the information, the data receiver forms positioning data in a group associated with the wireless station based on time periods. It is noted that when none of the entries in the wireless station information table 251 identifies the detected wireless station, a new entry can be generated.

Further, in an example, positioning server 230 includes a data processor (not shown). The data processor is configured to analyze the positioning data, to exclude one or more outliers from the positioning data, and to combine the current positioning data with the historical positioning data in the positioning database 261. In addition, in an example, the positioning server 230 includes a location estimator (not shown). The location estimator is configured to determine an estimated location of a wireless station (e.g., latitude and longitude of the cellular base station in the field (6) and (7) of the entry in the first wireless station information table), to calculate uncertainty values (e.g., uncertainty errors in the field (8), (10), (12), (14) of the entry in the first wireless station information table), and to calculate coverage area length and transmission signal range (e.g., the coverage range and RSSI threshold in the field (16) and (17) of the entry in the first wireless station information table). Further, in an example, positioning server 230 includes a cluster allocator (not shown). The cluster allocator is configured to dynamically adjust the clustering boundaries (e.g., RSSI boundary values in the field (18), (19), (20), (21) of the entry in the first wireless station information table) such that the subsets of the group have relatively equal population. The positioning data are stored in the positioning database 261.

Figure 3:
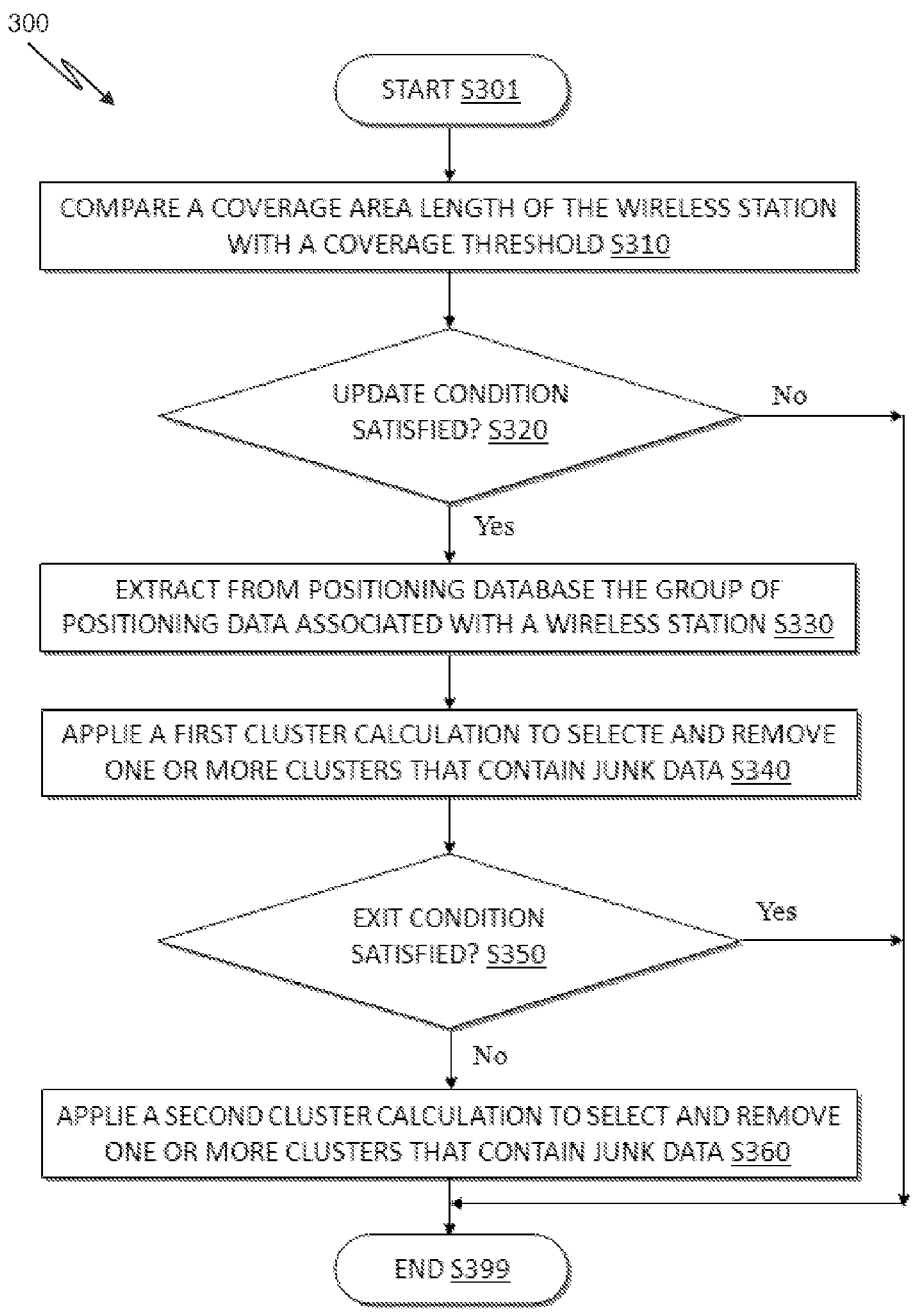
FIG. 3 depicts an example flow chart outlining a process of a data management according to an embodiment of the disclosure.

FIG. 3 depicts an example flow chart outlining a process of a data management according to an embodiment of the disclosure. In an example, the process 300 is executed by the data management module 272 in the positioning server 230. The process starts at S301 and proceeds to S310.

At S310, the data management module 272 compares a coverage area length of the wireless station with a coverage threshold. The threshold number is related to a communication range of the wireless station to which the wireless device can communicate. In an example, the communication range can be a distance corresponding to the pass (e.g., 1500 meters for a cellular base station in a cellular network or 600 meters for an access point in a wireless LAN).

At S320, the data management module 272 determines whether an update condition is satisfied for the group of positioning data associated with a wireless station. In an example, the update condition is satisfied when the coverage area length of the wireless station reaches over the threshold. The coverage area length of the wireless station over the threshold indicates that the group of positioning data associated with a wireless station may contain junk data. When the update condition is satisfied, the process proceeds to S330; otherwise, the process proceeds to S399 and terminates.

At S330, the data management module 272 extracts from positioning database the group of positioning data associated with a wireless station.

At S340, the data management module 272 applies a first cluster calculation to select and remove one or more clusters that may contain junk data. Further details of the first cluster calculation processes will be described below with reference to FIG. 4.

At S350, the data management module 272 determines whether an exit condition is satisfied. In an example, the exit condition is satisfied when the first cluster calculation successfully removes one or more clusters. When the exit condition is satisfied, the process proceeds to S399 and terminates; otherwise, the process proceeds to S360.

At S360, the data management module 272 applies a second cluster calculation to select and remove one or more clusters that may contain junk data. Further details of the second cluster calculation processes will be described below with reference to FIG. 5. When the second cluster calculation successfully removes one or more clusters, the process proceeds to S399 and terminates.

Figure 4:
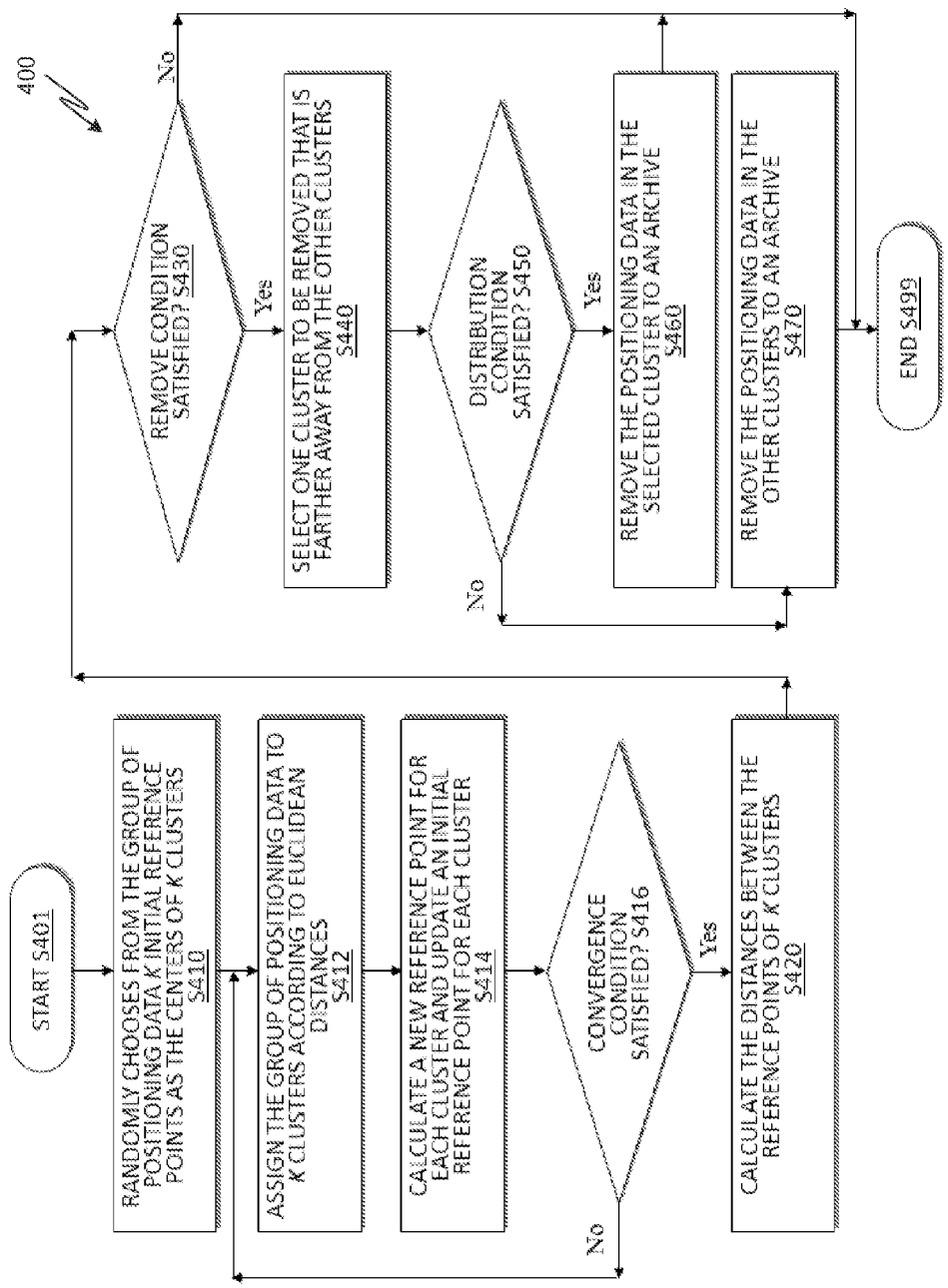
FIG. 4 depicts an example flow chart outlining a process of a first cluster calculation according to an embodiment of the disclosure.

FIG. 4 depicts an example flow chart outlining a process of a first cluster calculation according to an embodiment of the disclosure. In an example, the process 400 is executed by the data management module 272 when the group of positioning data associated with a wireless station need to be updated at S320. The process starts at S401 and proceeds to S410.

Initially, the process (S410) randomly chooses from the group of positioning data K initial reference points as the centers of K clusters, where K is positive odd number (e.g., K=3). In an example, the point is represented as the coordinate information (i.e., a pair of a latitude coordinate and a longitude coordinate). The process (S412) assigns the group of positioning data to K clusters according to Euclidean distances between the position information of the location in positioning data and K initial reference points.

After first defining K clusters, the process (S414) calculates a new reference point for each cluster by an average, or a weighted average of the position information of the location in positioning data in each cluster, to update an initial reference point for each cluster. The process (S416) can determine whether a convergence condition is satisfied. In an example, the convergence condition is satisfied when the distances between the initial reference points and the new reference points are all less than a distance threshold. The threshold number is related to a measure of cluster scatter to which the assignments of positioning data no longer change. In an example, the threshold number can be a distance corresponding to the pass (e.g., 5 meters for the pass). When the convergence condition is satisfied, the process can select and remove one or more clusters that may contain junk data; otherwise, the processes S412 and S414 are repeated to redefine the groupings to create clusters that better represent the positioning data in the cluster.

The process (S420) selects one or more clusters to be removed that include calculating the distances between the reference points of K clusters. The process (S430) can determine whether a remove condition is satisfied. In an example, the remove condition is satisfied when a ratio of a minimum distance and a maximum distance reaches below a ratio threshold number (e.g., 0.32 to reflect a confidence of estimate). When a ratio of a minimum distance and a maximum distance reaches over a ratio threshold number (i.e., the remove condition is not satisfied), it indicates that K clusters are close to each other, and the first cluster calculation cannot determine if any of K clusters corresponds to junk data. The process proceeds to S499 and terminates.

On the other hand, when a remove condition is satisfied, it indicates that the process (S440) can select one cluster to be removed that is farther away from the other clusters. The selected cluster includes a portion of the positioning data. The process (S450) can determine whether a distribution condition is satisfied. In an example, the distribution condition is satisfied when a ratio of the positioning data of the other clusters and the positioning data of the group reaches over a ratio threshold number (e.g., 0.68 to reflect a confidence of estimate). When the distribution condition is satisfied, the process (S460) may remove the positioning data in the selected cluster to an archive; otherwise, the process (S470) may remove the positioning data in the other clusters to the archive. Then, the process proceeds to S499 and terminates. After finish removing junk data, the data management module 272 updates the group of the positioning data associated with the wireless station.

Figure 5:
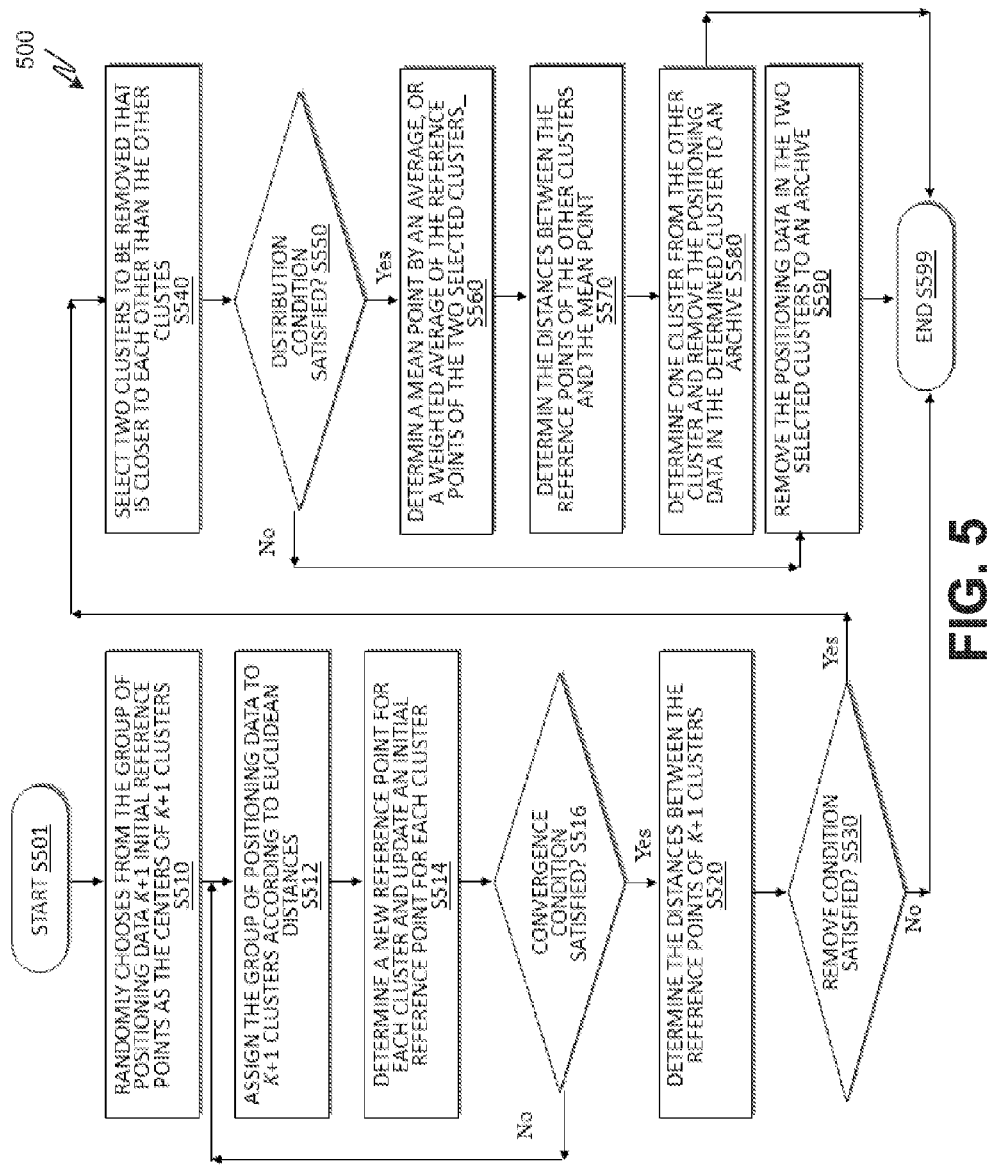
FIG. 5 depicts an example flow chart outlining a process of a second cluster calculation according to an embodiment of the disclosure.

FIG. 5 depicts an example flow chart outlining a process of a second cluster calculation according to an embodiment of the disclosure. In an example, the process 500 is executed by the data management module 272 when the group of positioning data associated with a wireless station need to be updated at S320, and the first cluster calculation at S430 cannot determine if any of K clusters corresponds to junk data. The process starts at S501 and proceeds to S510.

Initially, the process (S510) may randomly choose from the group of positioning data K+1 reference points as the centers of K+1 clusters. In an example, the point is represented as the coordinate information (i.e., a pair of a latitude coordinate and a longitude coordinate). The process (S512) may assign the group of positioning data to K+1 clusters according to Euclidean distances between the position information of the location in positioning data and K+1 initial reference points.

After first defining K+1 clusters, the process (S514) may determine a new reference point for each cluster by an average, or a weighted average of the position information of the location in positioning data in each cluster, to update an initial reference point for each cluster. The process (S516) can determine whether a convergence condition is satisfied. In an example, the convergence condition is satisfied when the distances between the initial reference points and the new reference points are all less than a distance threshold. The threshold number is related to a measure of cluster scatter to which the assignments of positioning data no longer change. In an example, the threshold number can be a distance corresponding to the pass (e.g., 5 meters for the pass). When the convergence condition is satisfied, the process selects and removes one or more clusters that may contain junk data; otherwise, the processes S512 and S514 are repeated to redefine the groupings to create clusters that better represent the positioning data in the cluster.

The process (S520) selects one or more clusters to be removed that include determining the distances between the reference points of K+1 clusters. The process (S530) can determine whether a remove condition is satisfied. In an example, the remove condition is satisfied when a ratio of a minimum distance and a maximum distance reaches below a ratio threshold number (e.g., 0.32 to reflect a confidence of estimate). When a ratio of a minimum distance and a maximum distance reaches over a ratio threshold number (i.e., the remove condition is not satisfied), it indicates that the population distribution of the positioning data is approximately uniform, and there is no need to remove any positioning data from the group of the positioning data associated with the wireless station. The process proceeds to S599 and terminates.

On the other hand, when a remove condition is satisfied, it indicates that the process (S540) can select two clusters from K+1 clusters that are closer to each other than the other clusters. The two selected clusters include a portion of the positioning data. The process (S550) can determine whether a distribution condition is satisfied. In an example, the distribution condition is satisfied when a ratio of the positioning data of the two selected clusters and the positioning data of the group reaches over a ratio threshold number (e.g., 0.68 to reflect a confidence of estimate). When the distribution condition is satisfied, the process (S560) may determine a mean point by an average, or a weighted average of the reference points of the two selected clusters. In an example, the mean point can be represented as the coordinate information (i.e., a pair of a latitude coordinate and a longitude coordinate). Then, the process (S570) may determine the distances between the reference points of the other clusters and the mean point. One cluster whose distance to the mean point has a maximum value can be determined from the other clusters. The process (S580) may remove the positioning data in the determined cluster to an archive.

On the other hand, when the distribution condition is not satisfied (i.e., a ratio of the positioning data of the two selected clusters and the positioning data of the group reaches below a ratio threshold number), the process (S590) may remove the positioning data in the two selected clusters to the archive. Then, the process proceeds to S599 and terminates. After finish removing junk data, the data management module 272 may update the group of the positioning data associated with the wireless station.

The features as described in reference to FIGS. 1-5 can be implemented in one or more computer programs that are performed by a processing system, including at least one programmable processor coupled to received data and instructions from, and to transmit data and instructions, to a data storage system, at least one input device, and at least one output device. A computer program is sets of instructions that can be used, directly or indirectly, in a computer to perform a certain activity or bring about a certain result. A computer program can be written in any form of programming language (e.g., Java, Objective-C), including compiled or interpreted languages, and can be deployed in any form, including as a stand-alone program or as a module, component, a browser-based web application, or other unit suitable for use in a computing environment.

The features can be performed in a computer system that can include a back-end component (e.g., a data server), or that can include a middleware component (e.g., an application server), or that can include a front-end component (e.g., a computer having a graphical user interface or an Internet browser, or any combination of them). The components of the system can be connected by any form or medium of data communication networks. In some implementations, communication networks can include a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

According to one embodiment, a system for location determination for mobile devices includes: a location database configured to store location data associated with one or more base stations in a network; and a data management component configured to compare the location-based parameters with one or more parameter thresholds, and update the location data based at least in part on the comparison of the location-based parameters and the parameter thresholds. The updated location data is used for location determination of a first mobile device.

For example, the location-based parameters include a cover range of the base stations. The data management component is further configured to compare the cover range with a coverage threshold, and in response to the cover range exceeding the coverage threshold, determine whether to remove part of the location data to update the location data. As another example, the data management component includes a first filter and a second filter. The first filter is configured to: allocate the location data into multiple first data clusters using a first K-means algorithm; and select one or more second data clusters from the first data clusters to be removed based at least in part on one or more first Euclidean distances associated with the second data clusters. The second filter is configured to, in response to the first filter not being able to select the second data clusters from the first data clusters: allocate the location data into multiple third data clusters using a second K-means algorithm, the third data clusters being more than the first data clusters in number; and select one or more fourth data clusters from the third data clusters to be removed based at least in part on one or more second Euclidean distances associated with the fourth data clusters.

In another example, the data management component is includes a loose filter. The loose filter is further configured to: determine three initial reference coordinates; allocate the location data into three first data clusters based at least in part on first Euclidean distances between the location data and the initial reference coordinates; determine three first reference coordinates for the first data clusters; determine second Euclidean distances between the first reference coordinates and the initial reference coordinates; in response to the second Euclidean distances being smaller than a distance threshold, calculate third Euclidean distances between the first reference coordinates; and in response to a first ratio between a minimum third Euclidean distance and a maximum third Euclidean distance being no larger than a ratio threshold, determine a second data cluster among the first data clusters, the second data cluster being far away from two other first data clusters and including a first portion of the location data; in response to the first portion being smaller than a portion threshold, select the second data cluster to be removed; and in response to the first portion being no smaller than the portion threshold, select the two other first data clusters to be removed.

In yet another example, the loose filter is further configured to, in response to a second Euclidean distance between the first reference coordinates and the initial reference coordinates being no smaller than the distance threshold: allocate the location data into three third data clusters based at least in part on fourth Euclidean distances between the location data and the first reference coordinates; determine three second reference coordinates for the third data clusters; determine fifth Euclidean distances between the second reference coordinates and the first reference coordinates; in response to the fifth Euclidean distances being smaller than the distance threshold, calculate sixth Euclidean distances between the second reference coordinates; and in response to a second ratio between a minimum sixth Euclidean distance and a maximum sixth Euclidean distance being no larger than the ratio threshold, determine a fourth data cluster among the third data clusters, the fourth data cluster being far away from two other third data clusters and including a second portion of the location data; in response to the second portion being smaller than the portion threshold, select the fourth data cluster to be removed; and in response to the second portion being no smaller than the portion threshold, select the two other third data clusters to be removed.

In yet another example, the loose filter is further configured to, in response to the first ratio being larger than the ratio threshold, select none from the first data clusters to be removed. The data management component includes a strict filter. The strict filter is configured to: determine four initial reference coordinates; allocate the location data into four first data clusters based at least in part on first Euclidean distances between the location data and the initial reference coordinates; determine four first reference coordinates for the first data clusters; determine second Euclidean distances between the first reference coordinates and the initial reference coordinates; in response to the second Euclidean distances being smaller than a distance threshold, calculate third Euclidean distances between the first reference coordinates; and in response to a first ratio between a minimum third Euclidean distance and a maximum third Euclidean distance being no larger than a ratio threshold, determine two second data clusters among the first data clusters, the second data clusters being closer to each other than two other first data clusters and including a first portion of the location data; in response to the first portion being no smaller than a portion threshold, calculate one or more first mean coordinates of the first reference coordinates associated with the second data clusters; determine fourth Euclidean distances between the first reference coordinates associated with the two other first data clusters and the first mean coordinates; and select a third data cluster among the first data clusters to be removed based at least in part on the fourth Euclidean distances, the third data cluster being far away from three other first data clusters; in response to the first portion being smaller than the portion threshold, select the second data clusters to be removed.

In one example, the strict filter is further configured to, in response to a second Euclidean distance between the first reference coordinates and the initial reference coordinates being no smaller than the distance threshold: allocate the location data into four fourth data clusters based at least in part on fifth Euclidean distances between the location data and the first reference coordinates; determine four second reference coordinates for the fourth data clusters; determine sixth Euclidean distances between the second reference coordinates and the first reference coordinates; in response to the sixth Euclidean distances being smaller than the distance threshold, calculate seventh Euclidean distances between the second reference coordinates; and in response to a second ratio between a minimum seventh Euclidean distance and a maximum seventh Euclidean distance being no larger than the ratio threshold, determine two fifth data clusters among the fourth data clusters, the fifth data clusters being closer to each other than two other fourth data clusters and including a second portion of the location data; in response to the second portion being no smaller than the portion threshold, calculate one or more second mean coordinates of the second reference coordinates associated with the fifth data clusters; determine eighth Euclidean distances between the second reference coordinates associated with the two other fourth data clusters and the second mean coordinates; and select a sixth data cluster among the fourth data clusters to be removed based at least in part on the eighth Euclidean distances, the sixth data cluster being far away from three other fourth data clusters; in response to the second portion being smaller than the portion threshold, select the fifth data clusters to be removed.

According to another embodiment, a device for mobile communications comprising: a local database configured to store first location data associated with one or more base stations in a network; and a location estimation component configured to receive first signal fingerprint data associated with the one or more base stations that communicate with the device, acquire the first location data from the local database using the first signal fingerprint data, and determine a current location of the device based at least in part on the first location data.

For example, a server location component configured to collect the first signal fingerprint data associated with the one or more base stations, transmit the first signal fingerprint data to a second server and receive an estimated location of the device from the second server. The second server is configured to determine second location data of the one or more base stations base at least in part on the first signal fingerprint data, allocate the second location data to one or more data clusters, and determine the estimated location based at least in part on the data clusters.

According to yet another embodiment, a method for location determination for mobile devices includes: storing location data associated with one or more base stations in a network; determining one or more location-based parameters of the base stations; comparing the location-based parameters with one or more parameter thresholds; and updating the location data based at least in part on the comparison of the location-based parameters and the parameter thresholds. The updated location data is used for location determination of a mobile device.

According to yet another embodiment, a method for location determination for mobile devices includes: storing location data associated with one or more base stations in a network; receiving signal fingerprint data associated with the one or more base stations that communicate with the device; acquiring the location data from the local database using the signal fingerprint data; and determining a current location of the device based at least in part on the location data.

The present disclosure describes a system and method for positioning data management applied to a server-based positioning system. The method includes determining whether an update condition for triggering an update for a group of the positioning data associated with a wireless station is satisfied, applying, when the update condition is satisfied, one or more cluster calculations to select one or more clusters that contains junk data to be removed from the group of the positioning data in order to increase the accuracy of positioning data, and storing the updated positioning data. The group of the updated positioning data is used for a server-based positioning system to determine the position information of a wireless device.

In accordance with the teachings described herein, a server system can receive messages carrying positioning data, form positioning data in a group associated with the wireless station, exclude one or more outliers from the positioning data, combine the current positioning data with the previously obtained positioning data in the database, determine an clustering information for a group of positioning data associated with a wireless station, and store the clustering information in a wireless station information table.

What is claimed is:

1. A system for positioning database management, the system comprising:
  a database configured to store positioning data, the positioning data associating position information of a location with an identifier of a wireless station for providing wireless connection at the location and a signal characteristic received at the location; and
  an apparatus configured to:
    determine whether an update condition for triggering an update for a group of the positioning data associated with a wireless station is satisfied;
    apply, when the update condition is satisfied, one or more cluster calculations to select one or more clusters that contain junk data to be removed from the group of the positioning data in order to increase the accuracy of positioning data; and
    store the updated positioning data;
  wherein the apparatus is configured to, when the update condition is satisfied:
    assign the positioning data in the group to multiple clusters according to Euclidean distances between the position information of the location in positioning data and initial reference points of multiple clusters;
    determine a new reference point of each cluster by an average, or a weighted average of the position information of the location in positioning data of each cluster, to update an initial reference point of each cluster;
    compare the distances between the initial reference points and the new reference points to a distance threshold;
    repeat the assignment, determination, and comparison until the distances between the initial reference points and the new reference points are all less than a distance threshold; and
    terminate the assignment of positioning data; and
  wherein the group of the updated positioning data is used for a server-based positioning system to determine the position information of a wireless device.

2. The system of claim 1, wherein the apparatus is configured to compare a coverage area length of the wireless station stored in wireless station information table to a threshold to determine whether the update condition is satisfied.

3. The system of claim 1, wherein the apparatus is configured to, when the update condition is satisfied:
  determine the distances between the reference points of multiple clusters;
  compare a ratio of a minimum distance and a maximum distance to a ratio threshold; and
  select one or more clusters form the multiple clusters when the ratio is smaller than the ratio threshold.

4. The system of claim 3, wherein the apparatus is further configured to:
  when the number of clusters is positive odd number, select one cluster from the multiple clusters that is farther away from the other clusters among the multiple clusters; and
  when the number of clusters is positive even number, select two clusters from the multiple clusters that are closer to each other than the other clusters among the multiple clusters.

5. The system of claim 4, wherein the apparatus is further configured to, when the number of clusters is positive odd number:
  when a ratio of the positioning data of the other clusters and the positioning data of the group reaches over a ratio threshold number, remove the positioning data in the one selected cluster to an archive; and
  when a ratio of the positioning data of the other clusters and the positioning data of the group reaches below a ratio threshold number, remove the positioning data in the other clusters to the archive.

6. The system of claim 4, wherein the apparatus is further configured to, when the number of clusters is positive even number:

when a ratio of the positioning data of the two selected clusters and the positioning data of the group reaches over a ratio threshold number, determine from the other clusters one cluster to be removed; and when a ratio of the positioning data of the two selected clusters and the positioning data of the group reaches below a ratio threshold number, remove the positioning data in the two selected clusters to an archive.

7. The system of claim 6, wherein the apparatus is further configured to:

determine a mean point by an average, or a weighted average of the reference points of the two selected clusters;

determine the distances between the reference points of the other clusters and the mean point;

determine from the other clusters one cluster whose distance to the mean point has a maximum value; and remove the positioning data in the determined cluster to an archive.

8. The system of claim 1, wherein the apparatus is further configured to:

include additional positioning data to the positioning data of the group; and determine whether the update condition is satisfied after the inclusion of the additional positioning data.

9. A method for positioning database management, the method comprising:

determining whether an update condition for triggering an update for a group of the positioning data associated with a wireless station is satisfied, the positioning data associating position information of a location with an identifier of a wireless station for providing wireless connection at the location and a signal characteristic received at the location;

applying, when the update condition is satisfied, one or more cluster calculations to select one or more clusters that contain junk data to be removed from the group of the positioning data in order to increase the accuracy of positioning data;

storing the updated positioning data;

assigning the positioning data in the group to multiple clusters according to Euclidean distances between the position information of the location in positioning data and the initial reference points of multiple clusters;

determining a new reference point of each cluster by an average, or a weighted average of the position information of the location in positioning data of each cluster, to update an initial reference point of each cluster;

comparing the distances between the initial reference points and the new reference points to a distance threshold;

repeating the assignment, determination, and comparison until the distances between the initial reference points and the new reference points are all less than a distance threshold; and terminating the assignments of positioning data;

wherein the group of the updated positioning data is used for a server-based positioning system to determine the position information of a wireless device.

10. The method of claim 9, further comprising:

comparing a coverage area length of the wireless station stored in wireless station information table to a threshold.

11. The method of claim 9, further comprising:

determining the distances between the reference points of multiple clusters;

comparing a ratio of a minimum distance and a maximum distance to a ratio threshold; and selecting one or more clusters form the multiple clusters when the ratio is smaller than the ratio threshold.

12. The method of claim 11, further comprising:

when the number of clusters is positive odd number, selecting one cluster form the multiple clusters that is farther away from the other clusters among the multiple clusters; and when the number of clusters is positive even number, selecting two clusters from the multiple clusters that are closer to each other than the other clusters among the multiple clusters.

13. The method of claim 12, further comprising:

when the number of clusters is positive odd number, when a ratio of the positioning data of the other clusters and the positioning data of the group reaches over a ratio threshold number, removing the positioning data in the one selected cluster to an archive; and when a ratio of the positioning data of the other clusters and the positioning data of the group reaches below a ratio threshold number, removing the positioning data in the other clusters to the archive.

14. The method of claim 12, further comprising:

when the number of cluster is positive even number, when a ratio of the positioning data of the two selected clusters and the positioning data of the group reaches over a ratio threshold number, determining from the other clusters one cluster to be removed; and when a ratio of the positioning data of the two selected clusters and the positioning data of the group reaches below a ratio threshold number, removing the positioning data in the two selected clusters to an archive.

15. The method of claim 14, further comprising:

determining a mean point by an average, or a weighted average of the reference points of the two selected clusters;

determining the distances between the reference points of the other clusters and the mean point;

determining from the other clusters one cluster whose distance to the mean point has a maximum value; and removing the positioning data in the determined cluster to an archive.

16. The method of claim 9, further comprising:

including additional positioning data to the positioning data of the group; and determining whether the update condition is satisfied after the inclusion of the additional positioning data.

17. A system configured to:

store positioning data in a database, wherein the positioning data associates, for each location of multiple locations to which a wireless station provides wireless service, characteristics of signals received at the respective location; and update the positioning data by:

designating reference points;

grouping the locations into clusters, one cluster for each reference point, based on distances between the locations and the reference points;

updating, for each cluster, the position of the reference point of the cluster based on an average of the locations that are in the cluster;

comparing, for each reference point, (i) the distance the updating has moved the reference point to (ii) a distance threshold; and repeating the grouping, the updating, and the comparing until the compared distances are all less than the distance threshold; and storing the updated positioning data, to be used for a server-based positioning system to determine the position information of a wireless device.

18. A method comprising:

storing positioning data in a database, wherein the positioning data associates, for each location of multiple locations to which a wireless station provides wireless service, characteristics of signals received at the respective location; and updating the positioning data by:
- designating reference points;
- grouping the locations into clusters, one cluster for each reference point, based on distances between the locations and the reference points;
- updating, for each cluster, the position of the reference point of the cluster based on an average of the locations that are in the cluster;
- comparing, for each reference point, (i) the distance the updating has moved the reference point to (ii) a distance threshold; and
- repeating the grouping, the updating, and the comparing until the compared distances are all less than the distance threshold; and
- storing the updated positioning data, to be used for a server-based positioning system to determine the position information of a wireless device.

* * * * *